(12) United States Patent
Roo

(10) Patent No.: US 7,839,994 B1
(45) Date of Patent: Nov. 23, 2010

(54) CLASS A-B LINE DRIVER FOR GIGABIT ETHERNET

(75) Inventor: Pierte Roo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 959 days.

(21) Appl. No.: 11/067,749

(22) Filed: Mar. 1, 2005

(51) Int. Cl.
  H04M 1/00 (2006.01)
  H04M 9/00 (2006.01)
(52) U.S. Cl. .................................. 379/399.01
(58) Field of Classification Search ............ 379/399.01; 330/252–261; 326/115; 375/318
  See application file for complete search history.

(56) References Cited

U.S. PATENT DOCUMENTS

| | | | |
|---|---|---|---|
| 3,986,131 A | 10/1976 | Ross et al. |
| 4,092,613 A | 5/1978 | Boubouleix |
| 4,160,216 A | 7/1979 | Thornton |
| 4,295,101 A | 10/1981 | Leidich |
| 4,296,382 A | 10/1981 | Hoover |
| 4,335,360 A | 6/1982 | Hoover |
| 4,415,865 A | 11/1983 | Gustafsson |
| 4,419,631 A | 12/1983 | Bertails et al. |
| 4,458,213 A | 7/1984 | Quan |
| 4,491,804 A | 1/1985 | Main et al. |
| 4,529,948 A | 7/1985 | Bingham |
| 4,570,128 A | 2/1986 | Monticelli |
| 4,587,491 A | 5/1986 | Koterasawa |
| 4,607,233 A | 8/1986 | Van Tuijl |
| 4,682,119 A | 7/1987 | Michel |
| 4,752,745 A | 6/1988 | Pass |
| 4,814,723 A | 3/1989 | Botti |
| 4,970,471 A | 11/1990 | Taylor |
| 4,999,586 A | 3/1991 | Meyer et al. |
| 5,039,953 A | 8/1991 | Su |
| 5,057,789 A | 10/1991 | Nagaraj |
| 5,148,120 A | 9/1992 | Kano et al. |
| 5,294,892 A | 3/1994 | Ryat |
| 5,334,950 A | 8/1994 | Arimoto |
| 5,337,007 A | 8/1994 | Barrett, Jr. et al. |
| 5,382,838 A | 1/1995 | Sasaki et al. |
| 5,412,344 A | 5/1995 | Franck |
| 5,426,641 A | 6/1995 | Afrashteh et al. |
| 5,442,319 A | 8/1995 | Seesink et al. |
| 5,442,320 A | 8/1995 | Kunst et al. |

(Continued)

OTHER PUBLICATIONS

You, Fan, et al., "Low-Voltage Class AB Buffers with Quiescent Current Control," IEEE Journal of Solid-State Circuits, vol. 33, No. 6, Jun. 1998, pp. 915-920.

(Continued)

Primary Examiner—Alexander Jamal

(57) ABSTRACT

A system and method for transmitting information includes a first driver circuit configured to generate a first component signal of a differential signal at a first polarity. The system includes a second driver circuit configured to generate a second component signal of the differential signal at a second polarity. The first and second component signals are biased to form biased first and second component signals. A differential amplitude of a combination of the biased first and second component signals is less than a corresponding differential amplitude of the differential signal. The system includes an offset signal circuit in communication with the first and second driver circuits. The offset signal circuit is configured to generate an offset signal for offsetting the biased first and second component signals. A combination of the offset and biased first and second component signals forms the differential signal.

47 Claims, 9 Drawing Sheets

U.S. PATENT DOCUMENTS

| | | | |
|---|---|---|---|
| 5,475,343 | A | 12/1995 | Bee |
| 5,491,448 | A | 2/1996 | Naokawa et al. |
| 5,497,122 | A | 3/1996 | Somayajula |
| 5,497,124 | A | 3/1996 | Yamashita et al. |
| 5,504,458 | A | 4/1996 | Van Brunt et al. |
| 5,512,857 | A | 4/1996 | Koskowich |
| 5,621,357 | A | 4/1997 | Botti et al. |
| 5,654,672 | A | 8/1997 | Bailey et al. |
| 5,786,731 | A | 7/1998 | Bales |
| 5,825,244 | A | 10/1998 | Somayajula |
| 5,825,246 | A | 10/1998 | Koifman et al. |
| 5,854,573 | A | 12/1998 | Chan |
| 5,856,759 | A | 1/1999 | Krochmal |
| 5,900,783 | A | 5/1999 | Dasgupta |
| 5,963,093 | A | 10/1999 | Corsi |
| 5,963,094 | A | 10/1999 | Linder et al. |
| 6,037,825 | A | 3/2000 | Kung |
| 6,078,220 | A | 6/2000 | Bales |
| 6,084,477 | A | 7/2000 | Corsi |
| 6,094,571 | A | 7/2000 | Groe |
| 6,121,839 | A | 9/2000 | Giacomini |
| 6,124,740 | A | 9/2000 | Klemmer |
| 6,127,891 | A | 10/2000 | Eschauzier et al. |
| 6,154,063 | A | 11/2000 | Fang et al. |
| 6,166,603 | A | 12/2000 | Smith |
| 6,188,281 | B1 | 2/2001 | Smith et al. |
| 6,194,966 | B1 | 2/2001 | Dasgupta |
| 6,255,909 | B1 | 7/2001 | Muza |
| 6,259,280 | B1 | 7/2001 | Koelling |
| 6,259,745 | B1 | 7/2001 | Chan |
| 6,281,751 | B1 | 8/2001 | Maulik |
| 6,294,958 | B1 | 9/2001 | Eschauzier |
| 6,313,667 | B1 | 11/2001 | Eschauzier |
| 6,353,298 | B1 | 3/2002 | Jeffrey |
| 6,366,169 | B1 | 4/2002 | Ivanov |
| 6,369,653 | B1 | 4/2002 | Kappes |
| 6,374,043 | B1 | 4/2002 | El-Sherif et al. |
| 6,384,685 | B1 | 5/2002 | Juang |
| 6,417,733 | B1 | 7/2002 | Corsi et al. |
| 6,445,530 | B1 | 9/2002 | Baker |
| 6,459,338 | B1 | 10/2002 | Acosta et al. |
| 6,486,736 | B2 | 11/2002 | Cusinato et al. |
| 6,492,870 | B2 | 12/2002 | Escobar-Bowser |
| 6,496,067 | B1 | 12/2002 | Behzad et al. |
| 6,501,334 | B1 | 12/2002 | Corsi et al. |
| 6,529,071 | B2 | 3/2003 | Casier et al. |
| 6,535,063 | B1 | 3/2003 | Gibson et al. |
| 6,542,032 | B2 | 4/2003 | Escobar-Bowser et al. |
| 6,545,538 | B1 | 4/2003 | Ivanov et al. |
| 6,556,081 | B2 | 4/2003 | Muza |
| 6,573,795 | B2 | 6/2003 | Whitney et al. |
| 6,583,669 | B1 | 6/2003 | Eschauzier et al. |
| 6,590,453 | B2 | 7/2003 | Tran et al. |
| 6,614,306 | B1 | 9/2003 | Morrish |
| 6,624,696 | B1 | 9/2003 | Eschauzier et al. |
| 6,710,654 | B2 | 3/2004 | Parkhurst et al. |
| 6,720,798 | B2 | 4/2004 | Mulder et al. |
| 6,720,817 | B2 | 4/2004 | El-Gamal |
| 6,727,758 | B2 | 4/2004 | Govil |
| 6,750,716 | B2 | 6/2004 | Cusinato et al. |
| 6,784,739 | B2 | 8/2004 | Reffay et al. |
| 6,816,014 | B2 | 11/2004 | Whitney et al. |
| 6,828,855 | B1 | 12/2004 | Wang |
| 6,828,858 | B2 | 12/2004 | Larson et al. |
| 6,836,186 | B2 | 12/2004 | Lee et al. |
| 6,844,837 | B1 | 1/2005 | Sutardja et al. |

OTHER PUBLICATIONS

Giustolisi, G., et al., "1.2-V CMOS Op-Amp with a Dynamically Biased Output Stage," IEEE Journal of Solid-State Circuits, vol. 35, No. 4, Apr. 2000, pp. 632-636.

IEEE Standards 802.3ab, Mar. 8, 2002, pp. 147-249.

CLASS A-B LINE DRIVER FOR GIGABIT ETHERNET

BACKGROUND

1. Field of the Invention

The present invention relates to systems for communicating data via a communication channel. More particularly, the present invention relates to a communication scheme for a class A-B line driver that can be used with, for example, gigabit Ethernet or the like.

2. Background Information

A gigabit channel is a communication channel with a total data throughput of one gigabit per second. A gigabit channel typically includes four unshielded twisted pairs (hereinafter "UTP") of cables (e.g., Category-5 twisted pair cables) to achieve this data rate. I.E.E.E. Standard 802.3ab, herein incorporated by reference, describes the specifications for 1000BASE-T twisted-pair gigabit Ethernet. For signal transmission, various types of output stages can be used to drive resistive loads, such as UTPs, for data transmission in accordance with Ethernet network protocols, such as gigabit Ethernet.

For purposes of illustration, FIG. 1A illustrates a simple transmitter 100 for transmitting a differential output current signal, $I_{OUT}$. The transmitter 100 includes a first current source 102 configured to generate the positive component signal of the differential output current signal. A second current source 104 is configured to generate the negative component signal of the differential output current signal. The transmitter 100 is coupled to an interface circuit 110 for interfacing the transmitter 100 to a UTP 120. The interface circuit 110 can include resistors 112 and 114 arranged in series with a common-mode voltage $V_{CM}$ 116 located between them. The resistors 112 and 114 are arranged in parallel across the primary windings of an isolation transformer 118, with the secondary windings coupled to the UTP 120. The isolation transformer 118 includes a center tap on the primary windings with a DC center tap voltage, $V_{CT}$ 125. In differential mode, $I_{OUT}=I_{OUT+}-I_{OUT-}$. The magnitude of $I_{OUT}$ depends on the symbol to be transmitted and can vary, for example, from −40 mA to 40 mA (e.g., in 1000BASE-T and 100BASE-TX) and from −100 mA to 100 mA (e.g., in 10BASE-T). A bias or quiescent current, $I_{BIAS}$, is supplied by bias current supply 127 to bias the first and second current sources 102 and 104, as discussed below.

In 100BASE-T, for example, three transmit symbols are used: {−1, 0, 1}, where a positive pulse represents a "+1," a negative pulse represents a "−1," and the signal represents "0" otherwise. For purposes of illustration, FIG. 1B illustrates a transmit signal, $V_{TX}$ 130, for transmitting the symbol sequence {0, +1, 0, −1}. Several different classes of operation exist for transmitting such signals.

FIG. 1C illustrates an example of class A operation. In class A operation, the output devices conduct for the entire cycle of the output signal. In other words, both output devices conduct continuously for the entire cycle of the output signal. Class A operation typically biases drivers to a certain (large) quiescent or bias current, $I_{BIAS}$, e.g., $I_{BIAS}$=40 mA. For purposes of illustration, the transmitter 100 can drive a differential current 140 of 40 mA for class A operation. The center tap current of the transformer 118 will therefore be constant at 40 mA. Consequently, the corresponding common-mode current will not change, resulting in substantially noiseless operation of the transformer 118.

FIG. 1D illustrates an example of class B operation. In class B operation, the output devices conduct for approximately fifty percent of the cycle of the output signal. In other words, each output device is only turned on when it is driving a signal, otherwise it is turned off. Due to this operation, class B operation provides higher efficiency than class A operation, but poor linearity around the crossover region, due to the time it takes to turn one device off and the other device on. The bias current for class B operation is generally very small, being close to zero (and at zero in the ideal case). For purposes of illustration, the transmitter 100 can also drive a differential current 140 of 40 mA for class B operation. However, unlike in class A operation, the center tap current of the transformer 118 will be a transient current of 40 mA for transmitting symbols "+1" and "−1." Consequently, the common-mode current will change on the center tap, thereby inducing electro-magnetic interference (EMI) in the transformer 118. Such EMI will affect transmission of the output signal.

FIG. 1E illustrates an example of class A-B operation. In class A-B operation, the output devices conduct for greater than fifty percent, but less than one hundred percent, of the cycle of the output signal. Both output devices, then, conduct simultaneously for a portion of the cycle of the output signal. In class A-B operation, the drivers are carefully biased just above their fully off state so that the transition between drivers is smoother, thereby causing the output devices to conduct for more than half of, but less than the entire, cycle. Class A-B operation requires more bias current than in equivalent class B operation, but less bias current than in equivalent class A operation. For purposes of illustration, the transmitter 100 can also drive a differential current 140 of 40 mA for class A-B operation. As in class B operation, the center tap current of the transformer 118 will be a transient current for transmitting symbols "+1" and "4." Consequently, the common-mode current will change on the center tap, inducing EMI in the transformer 118, and again affecting transmission of the output signal.

Consequently, there is a need for a transmission scheme that can make transformer behavior more linear, as well as reduce EMI in the transformer.

SUMMARY OF THE INVENTION

A class A-B differential line driver is disclosed that can be used with, for example, gigabit Ethernet and the like. In accordance with exemplary embodiments of the present invention, according to a first aspect of the present invention, a line driver includes a first driver circuit. The first driver circuit is configured to generate a first component signal of a differential signal at a first polarity. The line driver includes a second driver circuit. The second driver circuit is configured to generate a second component signal of the differential signal at a second polarity. The first and second component signals are biased to form biased first and second component signals. The line driver includes an offset signal circuit in communication with the first and second driver circuits. The offset signal circuit is configured to generate an offset signal for offsetting the biased first and second component signals. A combination of the offset and biased first and second component signals forms the differential signal.

According to the first aspect, the line driver can include a summing circuit in communication with the first and second driver circuits. The summing circuit can be configured to combine the offset and biased first and second component signals to form the differential signal. The line driver can include a bias signal circuit in communication with the first and second driver circuits. The bias signal circuit can be configured to generate the bias signal for biasing the first and second component signals. The line driver can include a bias signal control circuit in communication with the bias signal circuit. The bias signal control circuit can be configured to control the bias signal circuit to alter the bias signal. The line driver can include an offset signal control circuit in communication with the offset signal circuit. The offset signal control circuit can be configured to control the offset signal circuit to alter the offset signal. The line driver can include a driver control circuit in communication with the first and second driver circuits. The driver control circuit can be configured to control generation of the first and second component signals by the first and second driver circuits, respectively. The line driver can include a line interface circuit in communication with the first and second driver circuits. The line interface circuit can be configured to interface the line driver to a communication channel.

According to the first aspect, each of the first and second driver circuits can comprise a current source. The differential signal can comprise a gigabit Ethernet signal. The line driver can be compatible with a standard such as, for example, 10BASE-T, 100BASE-T, 100BASE-TX, 1000BASE-T, 10 GBASE-T or the like. The line driver can be formed on a monolithic substrate. The line driver can comprise a class A-B differential line driver. According to an exemplary embodiment of the first aspect, an Ethernet controller can comprise the line driver. According to an alternative exemplary embodiment of the first aspect, a digital-to-analog converter can comprise the line driver.

According to a second aspect of the present invention, a class A-B line driver includes a first signal driver. The first signal driver is configured to produce a first transmit component signal of a differential transmit signal at a first polarity. The class A-B line driver includes a second signal driver. The second signal driver is configured to produce a second transmit component signal of the differential transmit signal at a second polarity. The class A-B line driver includes a bias circuit in communication with the first and second signal drivers. The bias circuit is configured to produce a bias signal for biasing the first and second transmit component signals. The class A-B line driver includes an offset circuit in communication with the first and second signal drivers. The offset circuit is configured to produce an offset signal for offsetting the biased first and second transmit component signals. A sum of the offset and biased first and second transmit component signals forms the differential transmit signal.

According to the second aspect, the class A-B line driver can include a bias control circuit in communication with the bias circuit. The bias control circuit can be configured to control the bias circuit to alter the bias signal. The class A-B line driver can include an accumulator in communication with the first and second signal drivers. The accumulator can be configured to accumulate the offset and biased first and second transmit component signals to form the differential transmit signal. The class A-B line driver can include an offset control circuit in communication with the offset circuit. The offset control circuit can be configured to control the offset circuit to alter the offset signal produced by the offset circuit. The class A-B line driver can include a signal driver control circuit in communication with the first and second signal drivers. The signal driver control circuit can be configured to control production of the first and second transmit component signals by the first and second signal drivers, respectively. The class A-B line driver can include an interface circuit for interfacing the class A-B line driver to a communication channel.

According to the second aspect, each of the first and second signal drivers comprises a current source. The differential transmit signal can comprise a gigabit Ethernet signal. The class A-B line driver can be formed on a monolithic substrate. The class A-B line driver can be compatible with a standard such as, for example, 10BASE-T, 100BASE-T, 100BASE-TX, 1000BASE-T, 10 GBASE-T or the like.

According to a third aspect of the present invention, a signal transmission system includes a first set of transmitters configured to generate a first component signal of a differential transmit signal at a first polarity. The signal transmission system includes a second set of transmitters configured to generate a second component signal of the differential transmit signal at a second polarity. The first and second component signals are biased to form biased first and second component signals. The signal transmission system includes an offset signal circuit in communication with the first and second sets of transmitters. The offset signal circuit is configured to generate an offset signal for offsetting the biased first and second component signals. A combination of the offset and biased first and second component signals forms the differential transmit signal.

According to the third aspect, each of the first and second sets of transmitters can comprise a summing circuit for combining the outputs of the transmitters within the set. The signal transmission system can include a summer in communication with the first and second sets of transmitters. The summer can be configured to combine the offset and biased first and second component signals to form the differential transmit signal. The signal transmission system can include a bias signal circuit in communication with the first and second sets of transmitters. The bias signal circuit can be configured to generate the bias signal for biasing the first and second component signals. The signal transmission system can include a bias signal control circuit in communication with the bias signal circuit. The bias signal control circuit can be configured to control the bias signal circuit to alter the bias signal. The signal transmission system can include an offset signal control circuit in communication with the offset signal circuit. The offset signal control circuit can be configured to control the offset signal circuit to alter the offset signal. The signal transmission system can include a transmission control circuit in communication with the first and second sets of transmitters. The transmission control circuit can be configured to control generation of the first and second component signals by the first and second sets of transmitters, respectively. The signal transmission system can include a line interface circuit in communication with the first and second sets of transmitters. The line interface circuit can be configured to interface the signal transmission system to a communication channel.

According to the third aspect, each transmitter within each of the first and second sets of transmitters can comprise a current source. The differential transmit signal can comprise a gigabit Ethernet signal. The signal transmission system can be compatible with a standard such as, for example, 10BASE-T, 100BASE-T, 100BASE-TX, 1000BASE-T, 10 GBASE-T or the like. The signal transmission system can be formed on a monolithic substrate. According to an exemplary embodiment of the third aspect, a class A-B line driver can comprise the signal transmission system. According to an alternative exemplary embodiment of the third aspect, an Ethernet controller can comprise the signal transmission system. According to an alternative exemplary embodiment of the third aspect, a digital-to-analog converter can comprise the signal transmission system.

According to a fourth aspect of the present invention, a signal transmission system includes a plurality of transmitters arranged in parallel. Each transmitter includes a first transmission circuit. The first transmission circuit is configured to generate a first component signal of a differential transmit signal at a first polarity. Each transmitter also includes a second transmission circuit. The second transmission circuit is configured to generate a second component signal of the differential transmit signal at a second polarity. The first component signals from each of the first transmission circuits are combined to form a first accumulated component signal. The second component signals from each of the second transmission circuits are combined to form a second accumulated component signal. The first and second accumulated component signals are biased to form biased first and second accumulated component signals. The signal transmission system includes an offset circuit in communication with the plurality of transmitters. The offset circuit is configured to generate an offset signal for offsetting the biased first and second accumulated component signals. A sum of the offset and biased first and second accumulated component signals forms the differential transmit signal.

According to the fourth aspect, the signal transmission system can include an accumulator in communication with each of the first transmission circuits. The accumulator can be configured to accumulate the first component signals to form the first accumulated component signal. The signal transmission system can include an accumulator in communication with each of the second transmission circuits. The accumulator can be configured to accumulate the second component signals to form the second accumulated component signal. The signal transmission system can include a summing circuit in communication with the plurality of transmitters. The summing circuit can be configured to sum the offset and biased first and second accumulated component signals to form the differential transmit signal. The signal transmission system can include a bias circuit in communication with the plurality of transmitters. The bias circuit can be configured to generate the bias signal for biasing the first and second accumulated component signals. The signal transmission system can include a bias control circuit in communication with the bias circuit. The bias control circuit can be configured to control the bias circuit to alter the bias signal. The signal transmission system can include an offset control circuit in communication with the offset circuit. The offset control circuit can be configured to control the offset circuit to alter the offset signal. The signal transmission system can include a transmission control circuit in communication with the plurality of transmitters. The transmission control circuit can be configured to control generation of the first and second accumulated component signals by the plurality of transmitters. The signal transmission system can include an interface circuit in communication with the plurality of transmitters. The interface circuit can be configured to interface the signal transmission system to a communication channel.

According to the fourth aspect, each of the first and second transmission circuits can comprise a current source. The differential transmit signal can comprise a gigabit Ethernet signal. The signal transmission system can be compatible with a standard such as, for example, 10BASE-T, 100BASE-T, 100BASE-TX, 1000BASE-T, 10 GBASE-T or the like. The signal transmission system can be formed on a monolithic substrate. According to an exemplary embodiment of the fourth aspect, a class A-B line driver can comprise the signal transmission system. According to an alternative exemplary embodiment of the fourth aspect, an Ethernet controller can comprise the signal transmission system. According to an alternative exemplary embodiment of the fourth aspect, a digital-to-analog converter can comprise the signal transmission system.

According to a fifth aspect of the present invention, a method of transmitting information includes the steps of: a.) generating a first component signal of a differential signal at a first polarity; b.) generating a second component signal of the differential signal at a second polarity; c.) biasing the first and second component signals; d.) offsetting the biased first and second component signals; and e.) combining the offset and biased first and second component signals to form the differential signal.

According to the fifth aspect, the method can include the steps of: f.) generating the bias signal for biasing the first and second component signals in step (c); g.) controlling step (f) to alter the bias signal generated in step (f); h.) generating the offset signal for offsetting the biased first and second components signals in step (d); i.) controlling step (h) to alter the offset signal generated in step (h); j.) controlling step (a) to alter the first component signal generated in step (a); k.) controlling step (b) to alter the second component signal generated in step (b); and l.) transmitting the differential signal via a communication channel. The differential signal can comprise a gigabit Ethernet signal. The method can be compatible with a standard such as, for example, 10BASE-T, 100BASE-T, 100BASE-TX, 1000BASE-T, 10 GBASE-T or the like.

According to a sixth aspect of the present invention, a method of driving a communication channel includes the steps of: a.) producing a first transmit component signal of a differential transmit signal at a first polarity; b.) producing a second transmit component signal of the differential transmit signal at a second polarity; c.) generating a bias signal; d.) biasing the first and second transmit component signals with the bias signal generated in step (c); e.) generating an offset signal; f.) offsetting the biased first and second transmit component signals with the offset signal generated in step (e); and g.) summing the offset and biased first and second transmit component signals to form the differential transmit signal.

According to the sixth aspect, the method can include the steps of: h.) controlling step (c) to alter the bias signal generated in step (c); i.) controlling step (e) to alter the offset signal generated in step (e); j.) controlling step (a) to alter the first transmit component signal produced in step (a); k.) controlling step (b) to alter the second transmit component signal produced in step (b); and l.) transmitting the differential transmit signal via a communication channel. The differential transmit signal can comprise a gigabit Ethernet signal. The method can be compatible with a standard such as, for example, 10BASE-T, 100BASE-T, 100BASE-TX, 1000BASE-T, 10 GBASE-T or the like.

According to a seventh aspect of the present invention, a method of communicating information includes the steps of: a.) generating a plurality of first component signals of a differential transmit signal at a first polarity; b.) combining the plurality of first component signals to form a first accumulated component signal; c.) generating a plurality of second component signals of the differential transmit signal at a second polarity; d.) combining the plurality of second component signals to form a second accumulated component signal; e.) biasing the first and second accumulated component signals; f.) offsetting the biased first and second accumulated component signals; and g.) combining the offset and biased first and second accumulated component signals to form the differential transmit signal.

According to the seventh aspect, the method can include the steps of: h.) generating the bias signal for biasing the first and second accumulated component signals; i.) controlling step (h) to alter the bias signal generated in step (h); j.) generating the offset signal for offsetting the biased first and second accumulated component signals; k.) controlling step (j) to alter the offset signal generated in step (j); l.) controlling step (a) to alter the plurality of first transmit component signals generated in step (a); m.) controlling step (c) to alter the plurality of second transmit component signals produced in step (c); n.) transmitting the differential transmit signal via a communication channel. The differential transmit signal can comprise a gigabit Ethernet signal. The method can be compatible with a standard such as, for example, 10BASE-T, 100BASE-T, 100BASE-TX, 1000BASE-T, 10 GBASE-T or the like.

According to an eighth aspect of the present invention, a line driver includes a first means for driving a signal. The first signal driving means is configured to generate a first component signal of a differential signal at a first polarity. The line driver includes a second means for driving a signal. The second signal driving means is configured to generate a second component signal of the differential signal at a second polarity. The first and second component signals are biased to form biased first and second component signals. The line driver includes means for generating an offset signal for offsetting the biased first and second component signals. The offset signal generating means is in communication with the first and second signal driving means. A combination of the offset and biased first and second component signals forms the differential signal.

According to the eighth aspect, the line driver can include means for combining the offset and biased first and second component signals to form the differential signal. The combining means can be in communication with the first and second signal driving means. The line driver can include means for generating the bias signal for biasing the first and second component signals. The bias signal generating means can be in communication with the first and second signal driving means. The line driver can include means for controlling the bias signal generating means to alter the bias signal. The controlling means can be in communication with the bias signal generating means. The line driver can include means for controlling the offset signal generating means to alter the offset signal. The controlling means can be in communication with the offset signal circuit. The line driver can include means for controlling generation of the first and second component signals. The controlling means can be in communication with the first and second signal driving means. The line driver can include means for interfacing the line driver to a communication channel.

According to the eighth aspect, each of the first and second signal driving means can comprise a means for generating current. The differential signal can comprise a gigabit Ethernet signal. The line driver can be compatible with a standard such as, for example, 10BASE-T, 100BASE-T, 100BASE-TX, 1000BASE-T, 10 GBASE-T or the like. The line driver can be formed on a monolithic substrate. The line driver can comprise a class A-B differential line driver. According to an exemplary embodiment of the eighth aspect, an Ethernet controller can comprise the line driver. According to an alternative exemplary embodiment of the eighth aspect, a digital-to-analog converter can comprise the line driver.

According to a ninth aspect of the present invention, a class A-B line driver includes a first means for generating a signal. The first signal generating means is configured to produce a first transmit component signal of a differential transmit signal at a first polarity. The class A-B line driver includes a second means for generating a signal. The second signal generating means is configured to produce a second transmit component signal of the differential transmit signal at a second polarity. The class A-B line driver includes means for producing a bias signal for biasing the first and second transmit component signals. The bias signal producing means is in communication with the first and second signal generating means. The class A-B line driver includes means for producing an offset signal for offsetting the biased first and second transmit component signals. The offset signal producing means is in communication with the first and second signal generating means. A sum of the offset and biased first and second transmit component signals forms the differential transmit signal.

According to the ninth aspect, the class A-B line driver can include means for controlling the bias signal producing means to alter the bias signal. The controlling means can be in communication with the bias signal producing means. The class A-B line driver can include means for accumulating the offset and biased first and second transmit component signals to form the differential transmit signal. The accumulating means can be in communication with the first and second signal generating means. The class A-B line driver can include means for controlling the offset signal producing means to alter the offset signal. The controlling means can be in communication with the offset signal producing means. The class A-B line driver can include means for controlling production of the first and second transmit component signals. The controlling means can be in communication with the first and second signal generating means. The class A-B line driver can include means for interfacing the class A-B line driver to a communication channel.

According to the ninth aspect, each of the first and second signal generating means can comprise a means for generating current. The differential transmit signal can comprise a gigabit Ethernet signal. The class A-B line driver can be formed on a monolithic substrate. The class A-B line driver can be compatible with a standard such as, for example, 10BASE-T, 100BASE-T, 100BASE-TX, 1000BASE-T, 10 GBASE-T or the like.

According to a tenth aspect of the present invention, a signal transmission system includes a first set of means for transmitting signals configured to generate a first component signal of a differential transmit signal at a first polarity. The signal transmission system includes a second set of means for transmitting signals configured to generate a second component signal of the differential transmit signal at a second polarity. The first and second component signals are biased to form biased first and second component signals. The signal transmission system includes means for generating an offset signal for offsetting the biased first and second component signals. The offset signal generating means is in communication with the first and second sets of signal transmitting means. A combination of the offset and biased first and second component signals forms the differential transmit signal.

According to the tenth aspect, each of the first and second sets of signal transmitting means can include means for combining the outputs of the signal transmitting means within the set. The signal transmission system can include means for summing the offset and biased first and second component signals to form the differential transmit signal. The summing means can be in communication with the first and second sets of signal transmitting means. The signal transmission system can include means for generating the bias signal for biasing the first and second component signals. The bias signal generating means can be in communication with the first and second sets of signal transmitting means. The signal transmission system can include means for controlling the bias signal generating means to alter the bias signal. The controlling means can be in communication with the bias signal generating means. The signal transmission system can include means for controlling the offset signal generating means to alter the offset signal. The controlling means can be in communication with the offset signal generating means. The signal transmission system can include means for controlling generation of the first and second component signals. The controlling means can be in communication with the first and second sets of signal transmitting means. The signal transmission system can include means for interfacing the signal transmission system to a communication channel.

According to the tenth aspect, each signal transmission means within each of the first and second sets of signal transmitting means can comprise a means for generating current. The differential transmit signal can comprise a gigabit Ethernet signal. The signal transmission system can be compatible with a standard such as, for example, 10BASE-T, 100BASE-T, 100BASE-TX, 1000BASE-T, 10 GBASE-T or the like. The signal transmission system can be formed on a monolithic substrate. According to an exemplary embodiment of the tenth aspect, a class A-B line driver can comprise the signal transmission system. According to an alternative exemplary embodiment of the tenth aspect, an Ethernet controller can comprise the signal transmission system. According to an alternative exemplary embodiment of the tenth aspect, a digital-to-analog converter can comprise the signal transmission system.

According to an eleventh aspect of the present invention, a signal transmission system includes a plurality of means for transmitting signals arranged in parallel. Each signal transmitting means includes a first means for generating a signal. The first signal generating means is configured to generate a first component signal of a differential transmit signal at a first polarity. Each signal transmitting means includes a second means for generating a signal. The second signal generating means is configured to generate a second component signal of the differential transmit signal at a second polarity. The first component signals from each of the first signal generating means are combined to form a first accumulated component signal. The second component signals from each of the second signal generating means are combined to form a second accumulated component signal. The first and second accumulated component signals include a bias signal for biasing the first and second accumulated component signals. The signal transmission system includes means for generating an offset signal for offsetting the biased first and second accumulated component signals. The offset signal generating means is in communication with the plurality of signal transmitting means. A sum of the offset and biased first and second accumulated component signals forms the differential transmit signal.

According to the eleventh aspect, the signal transmission system can include means for accumulating the first component signals to form the first accumulated component signal. The accumulating means can be in communication with each of the first signal generating means. The signal transmission system can include means for accumulating the second component signals to form the second accumulated component signal. The accumulating means can be in communication with each of the second signal generating means. The signal transmission system can include means for summing the offset and biased first and second accumulated component signals to form the differential transmit signal. The summing means can be in communication with the plurality of signal transmitting means. The signal transmission system can include means for generating the bias signal for biasing the first and second accumulated component signals. The bias signal generating means can be in communication with the plurality of signal transmitting means. The signal transmission system can include means for controlling the bias signal generating means to alter the bias signal. The controlling means can be in communication with the bias signal generating means. The signal transmission system can include means for controlling the offset signal generating means to alter the offset signal. The controlling means can be in communication with the offset signal generating means. The signal transmission system can include means for controlling generation of the first and second accumulated component signals. The controlling means can be in communication with the plurality of signal transmitting means. The signal transmission system can include means for interfacing the signal transmission system to a communication channel.

According to the eleventh aspect, each of the first and second signal generating means can comprise a means for generating current. The differential transmit signal can comprise a gigabit Ethernet signal. The signal transmission system can be compatible with a standard such as, for example, 10BASE-T, 100BASE-T, 100BASE-TX, 1000BASE-T, 10 GBASE-T or the like. The signal transmission system can be formed on a monolithic substrate. According to an exemplary embodiment of the eleventh aspect, a class A-B line driver can comprise the signal transmission. According to an alternative exemplary embodiment of the eleventh aspect, an Ethernet controller can comprise the signal transmission system. According to an alternative exemplary embodiment of the eleventh aspect, a digital-to-analog converter can comprise the signal transmission system.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a communication or transmission scheme for a class A-B differential line driver, transmitter, digital-to-analog converter (DAC) or the like that can be used with, for example, gigabit Ethernet or any suitable transmission protocol or network standard. According to exemplary embodiments, an offset current, $I_{OFFSET}$, is used to offset each of the signal components of a differential output signal in, for example, class A-B operation, in addition to the bias current that is used in such operation, thereby resulting in a higher minimum center tap current. As an additional offset current is used, the maximum amplitude or magnitude of each of the signal components of the differential output signal can be reduced by a proportional amount. The combination of the offset current, bias current and signal components results in a differential signal of a desired differential amplitude (e.g., as that required by the transmission scheme, transmission protocol or network standard). However, because current levels of the signal components has been reduced, the amount of electro-magnetic interference (EMI) induced in the isolation transformer or hybrid (e.g., used for interfacing a transmitter to a communication channel) is reduced by a proportional amount. The transformer core is also biased at a higher current, thereby resulting in behavior that is more linear. Additionally, by taking advantage of the coding scheme used to transmit symbols, the full offset current need not be produced at all times. Thus, exemplary embodiments of the present invention provide a transmission scheme that offers a reduction in EMI in, and an improvement of linear behavior of, a transformer or other suitable hybrid, and allows for an increase in the center tap current of the transformer without a correspondingly large increase in power consumption.

As used herein, a "line driver" can be any suitable type of transmitter or amplifier for transmitting signals via a communication channel. For example, a line driver can be used as a DAC or other like device.

Figure 2:
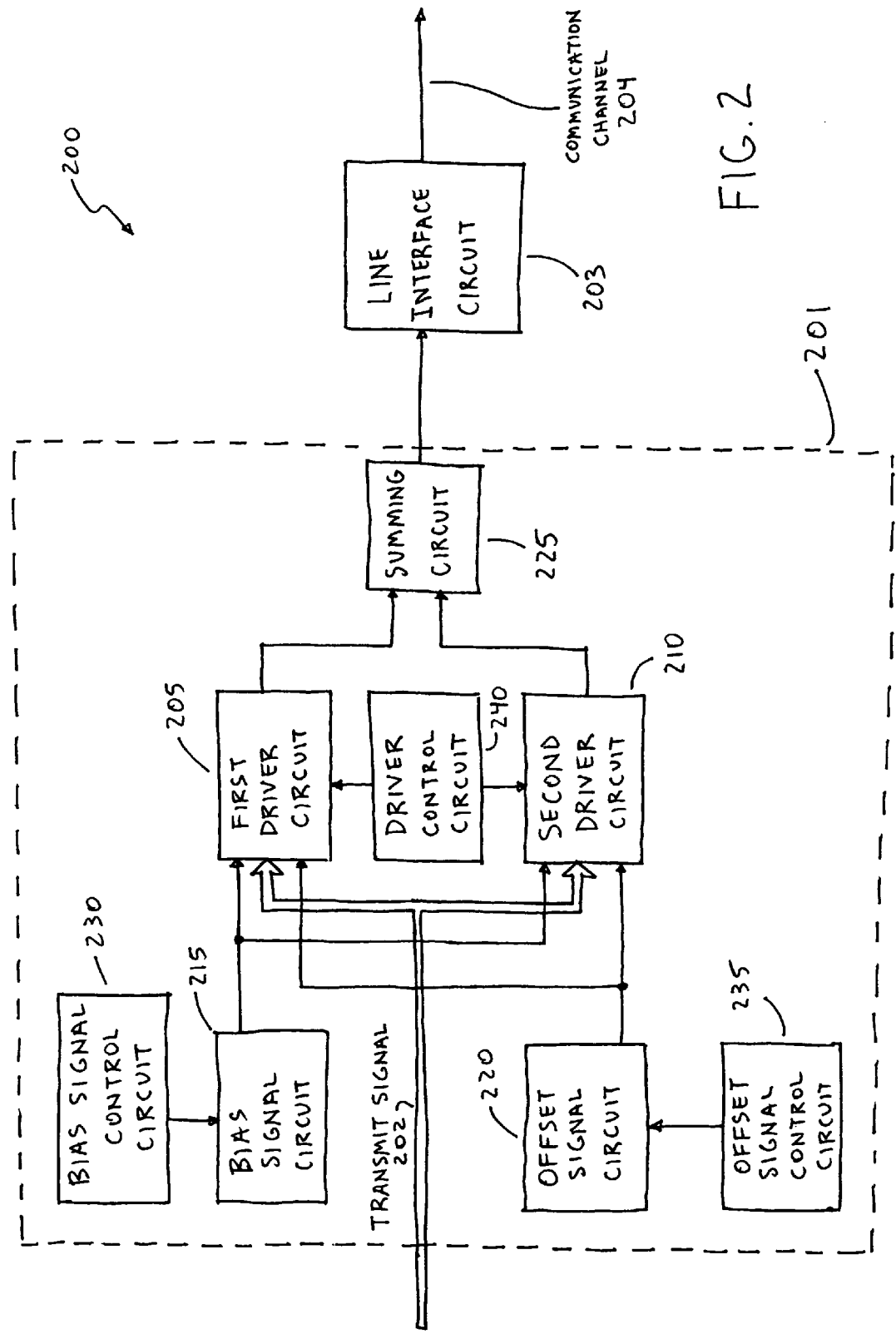
FIG. 2 is a diagram illustrating a signal transmission system, in accordance with an exemplary embodiment of the present invention.

These and other aspects of the present invention will now be described in greater detail. FIG. 2 is a diagram illustrating a signal transmission system 200, in accordance with an exemplary embodiment of the present invention. The signal transmission system 200 includes a line driver 201. The line driver 201 includes a first driver circuit 205. The first driver circuit 205 is configured to receive a transmit signal 202 and to generate a first component signal of a differential transmit signal at a first polarity (e.g., positive or negative polarity). The line driver 201 also includes a second driver circuit 210. The second driver circuit 210 is configured to receive the transmit signal 202 and to generate a second component signal of the differential transmit signal at a second polarity (e.g., a polarity different than the polarity of the first component signal, such as either negative or positive polarity). The signal transmission system 200 can include a line interface circuit 203 in communication with the first and second driver circuits 205 and 210 of line driver 201. The line interface circuit 203 can be configured to interface the line driver 201 to a communication channel 204.

The line driver 201 includes a bias signal circuit 215 in communication with the first and second driver circuits 205 and 210. The bias signal circuit 215 is configured to generate a bias signal for biasing the first and second component signals. The bias signal can be any suitable quiescent or bias current or voltage for biasing the first and second driver circuits 205 and 210, in accordance with the transmission scheme used. For example, for class A-B operation, the bias signal can be approximately five to ten percent of the maximum amplitude of the signal components.

Figure 1A:
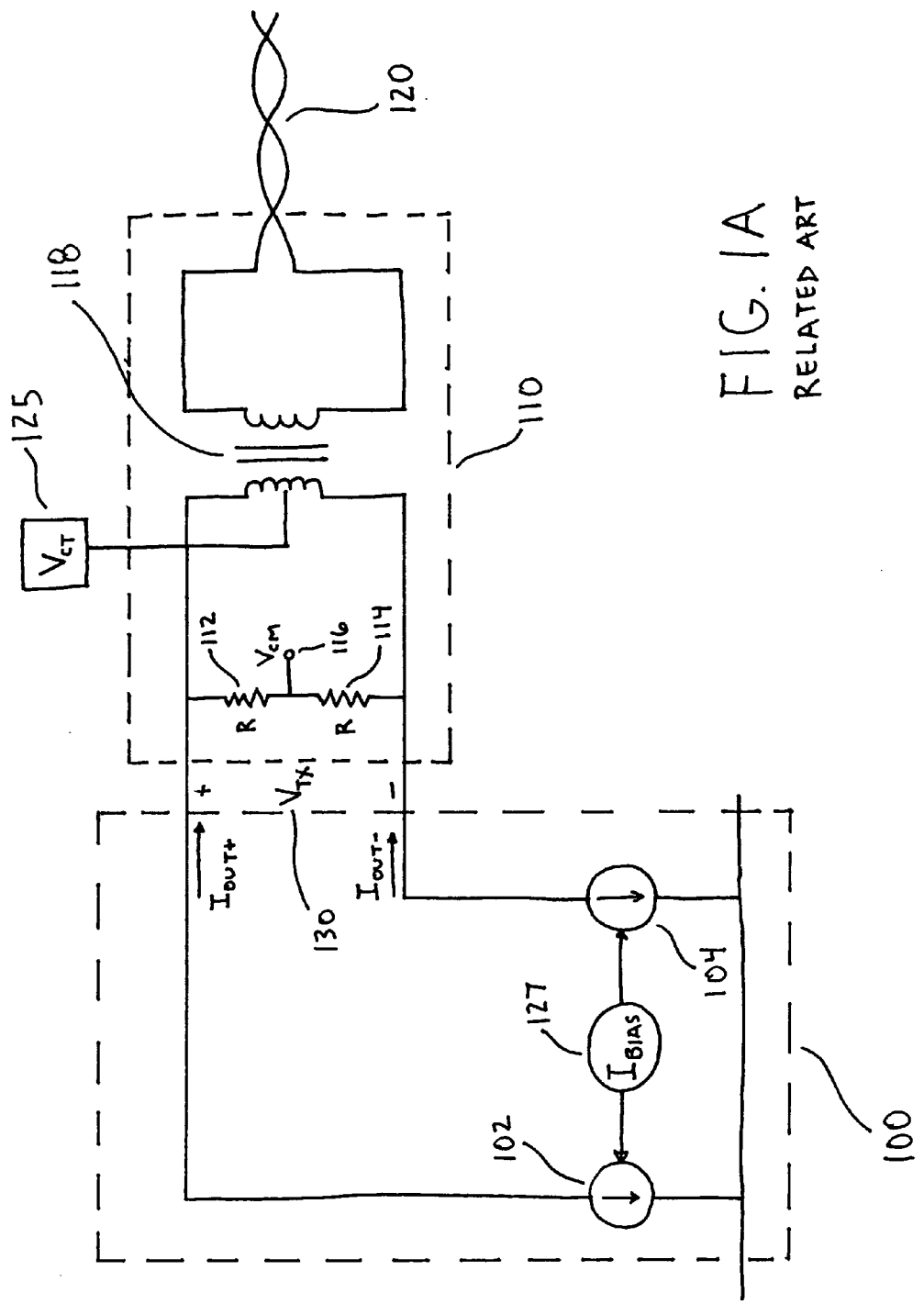
FIG. 1A illustrates a transmitter for transmitting a differential output current signal.
Figure 1B:
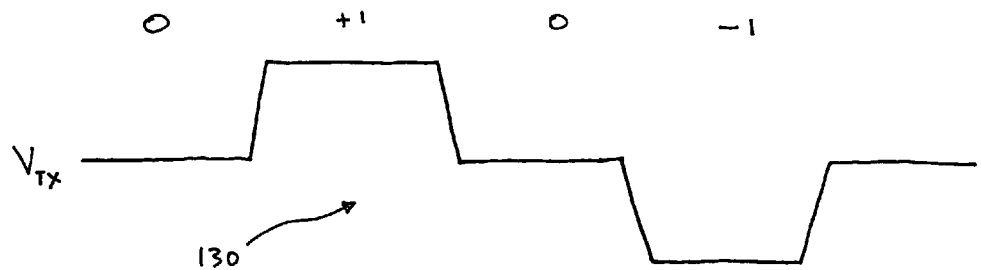
FIG. 1B illustrates a transmit signal for transmitting the symbols {0, +1, −1}.
Figure 1C:
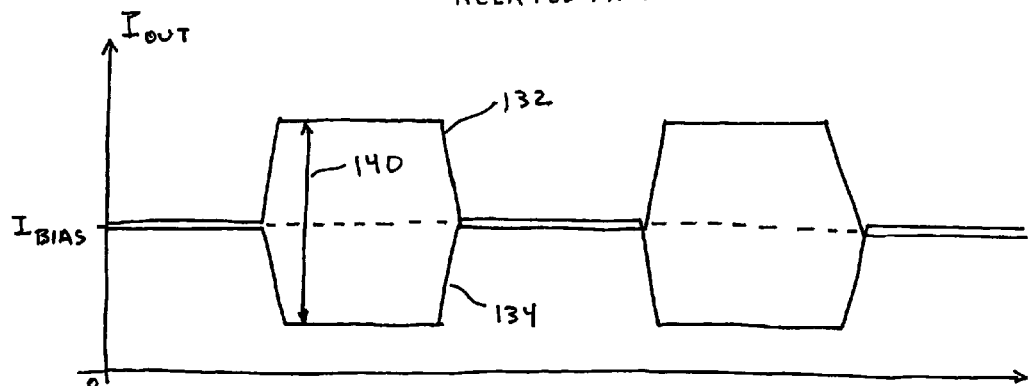
FIG. 1C illustrates an example of class A operation.
Figure 1D:
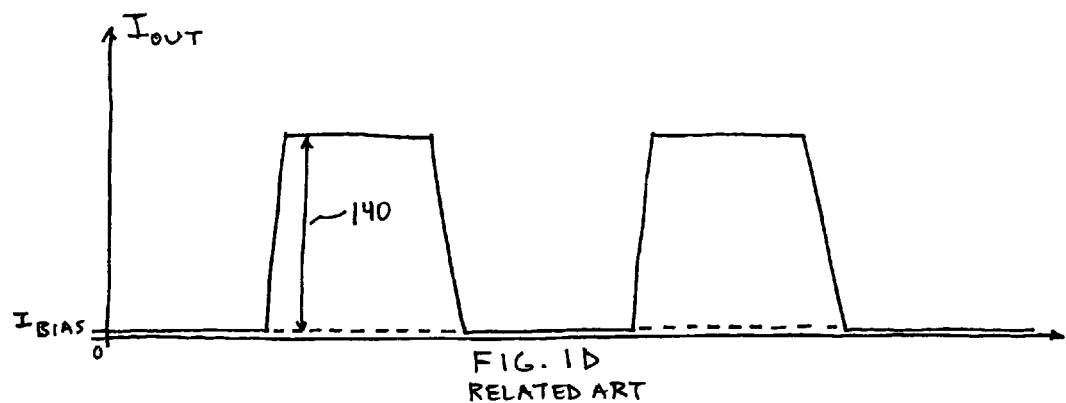
FIG. 1D illustrates an example of class B operation.
Figure 1E:
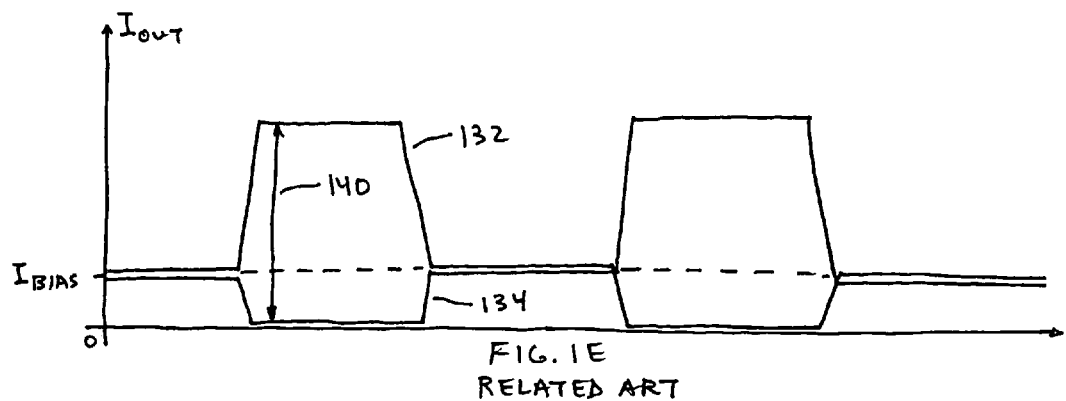
FIG. 1E illustrates an example of class A-B operation.

As discussed previously, FIG. 1E is an illustration of a conventional class A-B differential transmit signal comprised of the biased first and second signal components 132 and 134. For purposes of illustration, the first and second current drivers 205 and 210 can drive a differential current 140 of 40 mA, as used for gigabit Ethernet. Assuming a bias current, $I_{BIAS}$, of 2 mA, the total peak current would be $I_{OUT}$=40 mA+2 mA=42 mA for a conventional implementation.

Figure 3A:
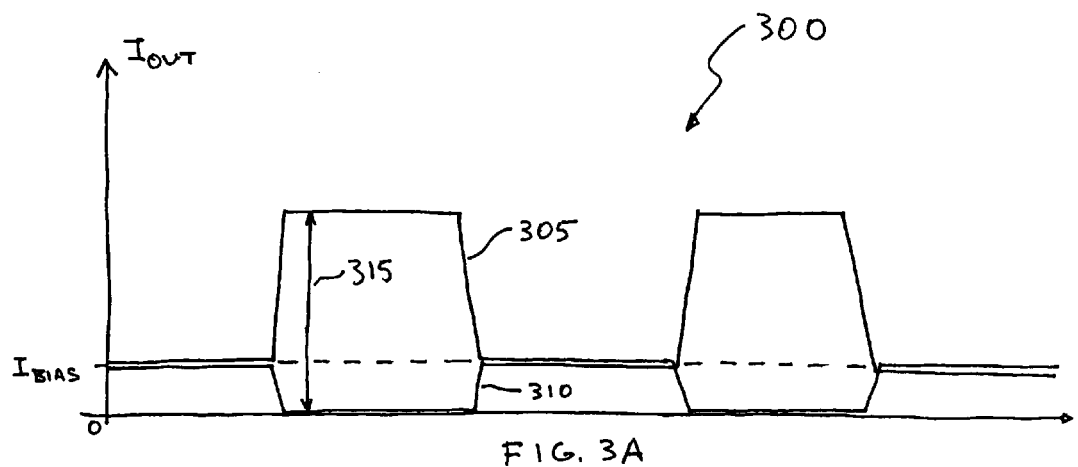
FIG. 3A is an illustration of a class A-B differential transmit signal comprised of biased first and second signal components, in accordance with an exemplary embodiment of the present invention.

However, according to exemplary embodiments, because an additional offset signal is used, the signal levels of the first and second signal components can be reduced. FIG. 3A is an illustration of a class A-B differential transmit signal 300 comprised of biased first and second signal components 305 and 310, in accordance with an exemplary embodiment of the present invention. Continuing with the illustration, a differential amplitude of 40 mA is desired, and the transmit signal $V_{TX}$ 130 (illustrated in FIG. 1B) is again used for transmitting symbols. The differential amplitude 315 of the combination of the biased first and second component signals 305 and 310 is the same as the corresponding differential amplitude of the (desired) differential transmit signal (e.g., 40 mA).

Figure 3B:
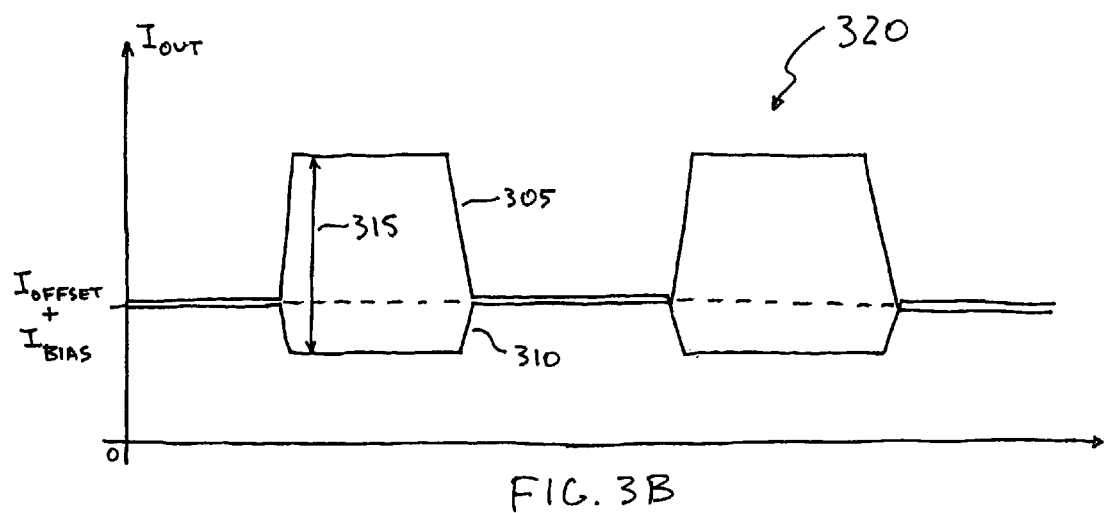
FIG. 3B is an illustration of a class A-B differential transmit signal comprised of offset and biased first and second signal components, in accordance with an exemplary embodiment of the present invention.

According to exemplary embodiments of the present invention, the line driver 201 includes an offset signal circuit 220 in communication with the first and second driver circuits 205 and 210. The offset signal circuit 220 is configured to generate an offset signal for offsetting the biased first and second component signals. The offset signal can be any suitable offset current or voltage for offsetting the biased first and second component signals. The offset signal increases the center tap current level from approximately 2 mA to 12 mA for the example embodiment described. For symbols "+1" and "−1", the introduction of the offset signal, decreases the magnitudes of the offset and biased first and second component signals 305, 310 above the center tap current level and increases the magnitudes of the offset and biased first and second component signals 305, 310 below the center tap current level. The combination of the offset and biased first and second component signals forms the differential transmit signal. The magnitude of the offset signal will depend on the amount of reduction in the signal levels of the first and second component signals 305 and 310. FIG. 3B is an illustration of a class A-B differential transmit signal 320 comprised of offset and biased first and second signal components 305 and 310, in accordance with an exemplary embodiment of the present invention. Continuing with the present illustration, the signal levels of the first and second component signals 305 and 310 have each been reduced by 10 mA, as $I_{OFFSET}$=10 mA. Assuming $I_{BIAS}$=2 mA, the differential amplitude of the offset and biased first and second component signals 305 and 310 will be 30 mA+10 mA=40 mA, as desired. Other values for the bias and offset signals and signal levels of the component signals can be chosen, depending on, for example, the transmission protocol or network standard used, the class of operation (e.g., the values can be chosen to maintain a particular class of operation), and the like, as the exemplary signals and signal values discussed are for purposes of illustration only and not limitation. For example, the bias signal, $I_{BIAS}$, can be chosen to appropriately bias the current drivers 205 and 210 for class A-B operation.

In the present illustration, the current level of the component signals has been reduced, a twenty-five percent reduction in current levels. Accordingly, EMI induced in the transformer or hybrid (such as that used in line interface circuit 203) will be proportionally reduced by the same amount (e.g., twenty-five percent). Additionally, as a higher current is being used to bias the transformer (e.g., $I_{OFFSET}+I_{BIAS}=10$ mA+2 mA=12 mA), the behavior of the transformer will be more linear.

The line driver 201 includes a summing circuit 225 in communication with the first and second driver circuits 205 and 210. The summing circuit 225 is configured to combine the offset and biased first and second component signals to form the differential transmit signal. The line driver 201 can include a bias signal control circuit 230 in communication with the bias signal circuit. The bias signal control circuit 230 is configured to control the bias signal circuit 215 to alter the bias signal, $I_{BIAS}$, to any desired value. The line driver 201 can include an offset signal control circuit 235 in communication with the offset signal circuit 220. The offset signal control circuit 235 is configured to control the offset signal circuit 220 to alter the offset signal, $I_{OFFSET}$, to any desired value. Either or both of the bias and offset signals can be varied, depending on, for example, the transmission protocol or network standard and class of operation used. Additionally, the line driver 201 can include a driver control circuit 240 in communication with the first and second driver circuits 205 and 210. The driver control circuit 240 is configured to control generation of the first and second component signals by the first and second driver circuits 205 and 210, respectively, in accordance with, for example, the transmission protocol or network standard used. For example, the driver control circuit 240 can be configured to control each driver circuit by turning each driver circuit on or off to generate the appropriate transmit signal.

Exemplary embodiments of the present invention also provide a power advantage by leveraging the coding scheme used to encode and transmit symbols and other data. In other words, for the given illustration, although an offset signal of 10 mA has been used to boost the bias current and achieve a differential current of 40 mA, the full offset signal is not required to be produced at all times, because of the coding scheme used. The 100BASE-T and 1000BASE-T network standards will be used to illustrate the advantage.

In 100BASE-T, three transmit symbols are used: {−1, 0, 1}. Such a transmission scheme is illustrated in transmit signal $V_{TX}$ 130 of FIG. 1B. Accordingly, the probability of transmitting a "+1," denoted as "$P_{+1}$," is 0.25. The probability of transmitting a "0," denoted as "$P_0$," is 0.50. The probability of transmitting a "−1," denoted as "$P_{-1}$," is 0.25. Therefore, the sum of the probabilities, $\Sigma P_i$, is 1.00. For the class A-B operation according to exemplary embodiments (assuming 40 mA differential output current, $I_{BIAS}=2$ mA, and $I_{OFFSET}=10$ mA), the average current through the transformer is given by Equation (1), as follows:

$$I_{AVE}=I_{+1}*P_{+1}+I_0*P_0+I_{-1}*P_{-1}=(42\text{ mA})*(0.25)+(10\text{ mA})*(0.5)+(42\text{ mA})*(0.25)=26\text{ mA} \quad (1)$$

For class A operation, the average current through the transformer is given by Equation (2), as follows:

$$I_{AVE}=40\text{ mA}+2\text{ mA}=42\text{ mA} \quad (2)$$

For class B operation, the average current through the transformer is given by Equation (3), as follows:

$$I_{AVE}=I_{+1}*P_{+1}+I_0*P_0+I_{-1}*P_{-1}=(42\text{ mA})*(0.25)+(2\text{ mA})*(0.5)+(42\text{ mA})*(0.25)=22\text{ mA} \quad (3)$$

As can be seen by comparing Equations (1) and (3), adding an offset signal of 10 mA (in the class A-B operation) increases the average current by 26 mA−22 mA=4 mA, when compared with the class B operation. Thus, the transformer is conducting only 40% of the added offset signal.

Figure 4:
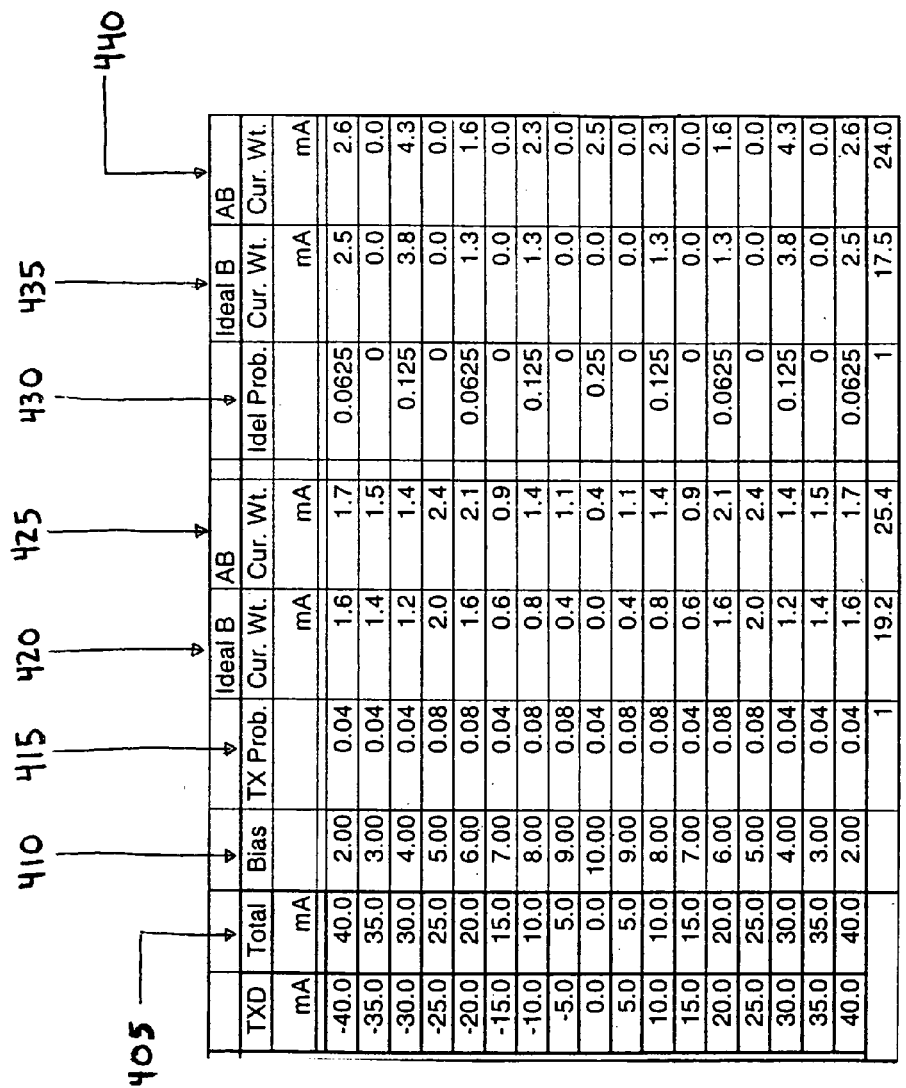
FIG. 4 is a chart illustrating the comparison of average current for class A-B operation and class B operation for 1000BASE-T, in accordance with an exemplary embodiment of the present invention.

FIG. 4 is a chart illustrating the comparison of average current for class A-B operation and class B operation for 1000BASE-T, in accordance with an exemplary embodiment of the present invention. 1000BASE-T comprises seventeen transmit symbol levels. The signal level for each transmit symbol is given in column 405. The corresponding offset signal added to the signal levels according to exemplary embodiments is given in column 410. The probability of transmitting each symbol is given in column 415. Column 420 indicates the product of the probability of transmitting a symbol (from column 415) and the signal level of the symbol (from column 405) for each symbol in class B operation. The total average current for class B operation (assuming a bias signal, $I_{BIAS}$, of 2 mA) is 19.2 mA+2 mA=21.2 mA. Column 425 indicates the product of the probability of transmitting a symbol (from column 415) and the signal level of the symbol with the corresponding offset signal (i.e., the addition of columns 405 and 410) for each symbol in the class A-B operation according to exemplary embodiments. The total average current for class A-B operation is 25.4 mA. Thus, adding the offset signals for class A-B operation increases the average current by 25.4 mA−21.2 mA=4.2 mA, when compared with class B operation.

When no data is being communicated, idle data is transmitted as an indication that the communication link is up. Columns 430, 435 and 440 of FIG. 4 illustrate the comparison of average current for class A-B operation and class B operation for 1000BASE-T for transmission of such idle data, in accordance with an exemplary embodiment of the present invention. The probability of transmitting each symbol of the idle data is given in column 430. Column 435 indicates the product of the probability of transmitting a symbol (from column 430) and the signal level of the symbol (from column 405) for each such transmitted symbol in class B operation. The total average current for class B operation (assuming a bias signal, $I_{BIAS}$, of 2 mA) is 17.5 mA+2 mA=19.5 mA. Column 440 indicates the product of the probability of transmitting a symbol (from column 430) and the signal level of the symbol with the corresponding offset signal (i.e., the addition of columns 405 and 410) for each such transmitted symbol in the class A-B operation according to exemplary embodiments. The total average current for class A-B operation is 24.0 mA. Thus, adding the offset signals for class A-B operation increases the average current by 24.0 mA−19.5 mA=4.5 mA, when compared with class B operation.

As these examples illustrate, the total power consumption will increase by a fraction of the increase in the center tap current. In other words, exemplary embodiments of the present invention can provide for an increase in the center tap current of the transformer without a corresponding increase in power consumption.

Other configurations of line driver 201 can be used. For example, first and second driver circuits 205 and 210 can feed into offset signal circuit 220 for the offset signal. The summing circuit 225 can form part of the line interface circuit 203, rather than a portion of the line driver 201. Alternatively, the bias signal control circuit 230, offset signal control circuit 235 and driver transmission control circuit 240 can be located remotely from line driver 201 (e.g., off chip), with the appropriate control signals supplied to the line driver 201. Additionally, the control functions provided by these control circuits can be combined into a single control circuit or fewer control circuits than three. Other configurations can also be used.

Figure 5:
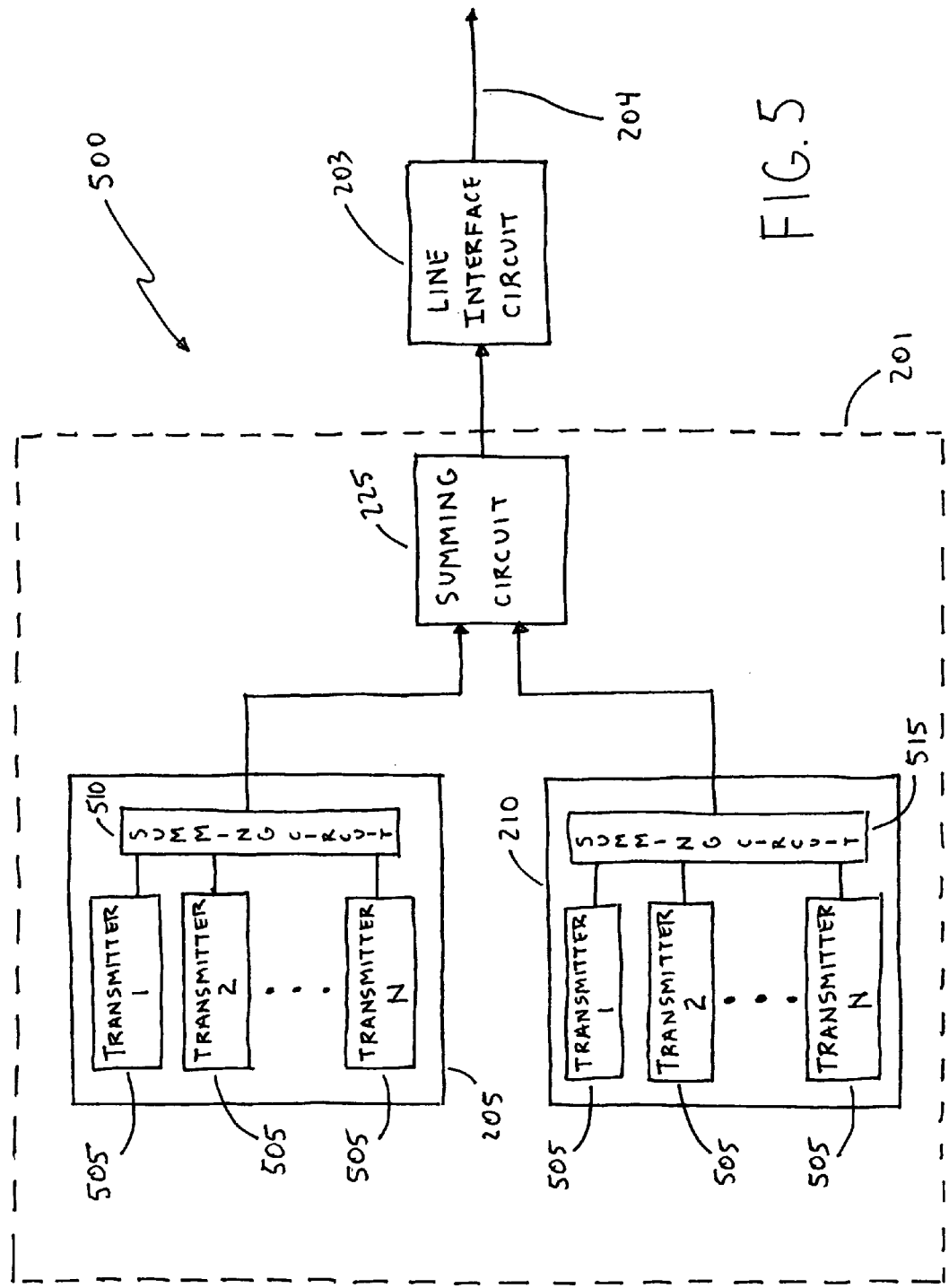
FIG. 5 illustrates a signal transmission system 500, in accordance with an alternative exemplary embodiment of the present invention.

For example, each of the first and second driver circuits 205 and 210 can be comprised of first and second sets of transmitters, respectively. FIG. 5 illustrates a signal transmission system 500, in accordance with an alternative exemplary embodiment of the present invention. In FIG. 5, the bias signal circuit 215, offset signal circuit 220, bias signal control circuit 230, offset signal control circuit 235, and driver control circuit 240 and the connections between and signals passed among those elements and first and second driver circuits 205 and 210 are identical to those as illustrated in FIG. 2 and as discussed above, and have not been included in FIG. 5 merely for purposes of clarity.

As illustrated in FIG. 5, each of the first and second driver circuits 205 and 210 can be comprised of N transmitters 505, where N can be any suitable number, and can be a different number for each of the driver circuits. Each of the transmitters 505 can be comprised of, for example, a current source or the like. The first set of transmitters 505 can be configured to generate the first component signal of the differential transmit signal at the first polarity. The second set of transmitters 505 can be configured to generate the second component signal of the differential transmit signal at the second polarity. According to the alternative exemplary embodiment, an output of a set of transmitters 505 comprises a combination of outputs of transmitters 505 within the set. Accordingly, each of the first and second sets of transmitters 505 can include a respective summing circuit (510 and 515) for combining the outputs of the transmitters 505 within each set. The first and second component signals can be biased and offset in a manner according to exemplary embodiments. The summing circuit 225 can then combine the offset and biased first and second component signals from the first and second sets of transmitters 505, respectively, to form the differential transmit signal. Alternatively, the summing circuit 225 can perform the combination of the outputs of the transmitters 505 within each set, so that summing circuits 510 and 515 can be eliminated.

Figure 6:
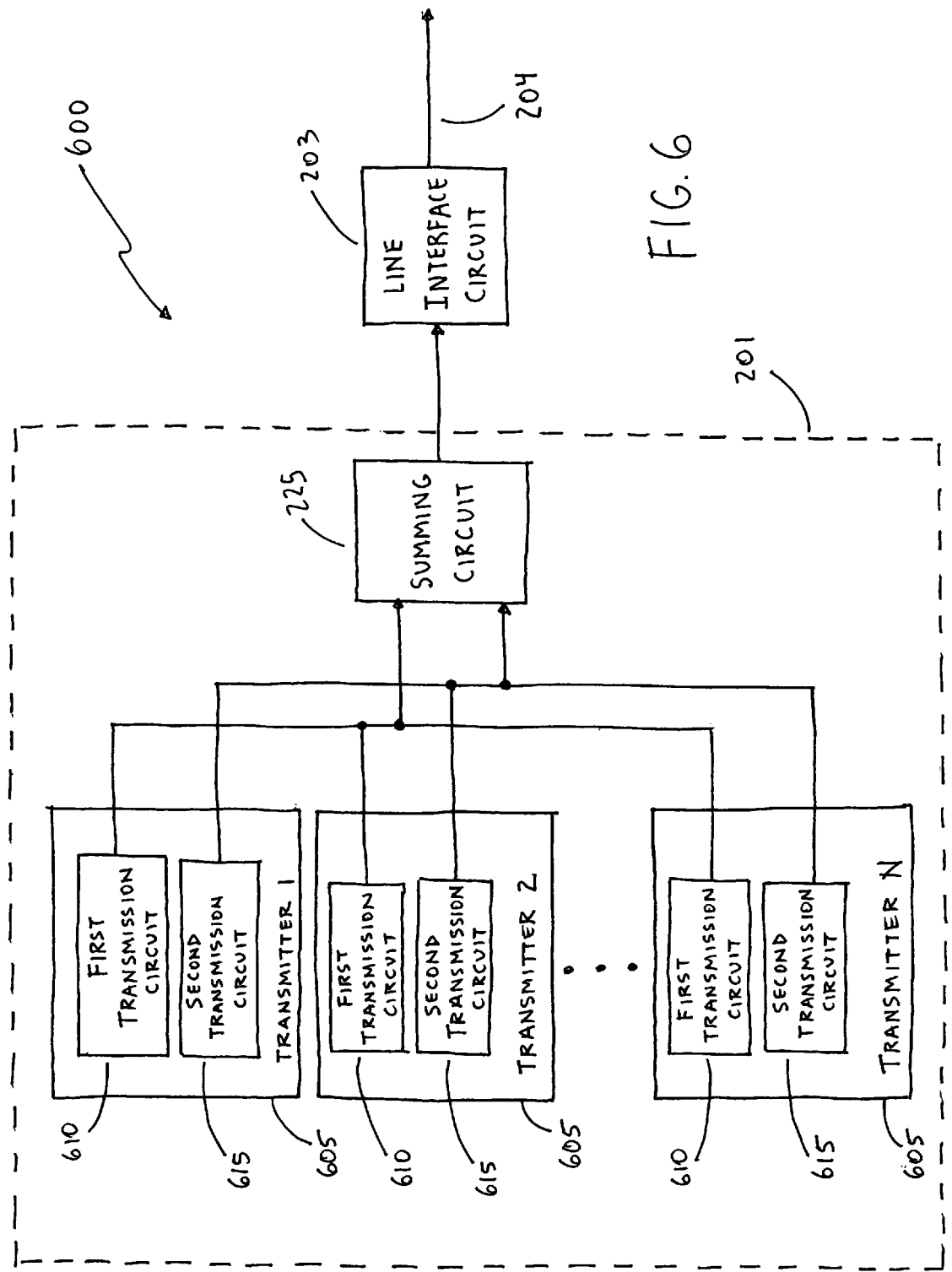
FIG. 6 illustrates a signal transmission system 600, in accordance with an alternative exemplary embodiment of the present invention.

Alternatively, the first and second driver circuits 205 and 210 can be replaced with a plurality of transmitters, with each transmitter comprised of a first driver circuit and a second driver circuit. FIG. 6 illustrates a signal transmission system 600, in accordance with an alternative exemplary embodiment of the present invention. In FIG. 6, the bias signal circuit 215, offset signal circuit 220, bias signal control circuit 230, offset signal control circuit 235, and driver control circuit 240 and the connections between and signals passed among those elements and the various first and second driver circuits are identical to those as illustrated in FIG. 2 and as discussed above, and have not been included in FIG. 6 merely for purposes of clarity.

As illustrated in FIG. 6, N transmitters 605 can be used, where N can be any suitable number. Each transmitter 605 can be comprised of a first transmission circuit 610 and a second transmission circuit 615. Each of the first and second transmission circuits 610 and 615 can be comprised of any suitable signal driver, such as, for example, a current source or the like. The first transmission circuit 610 of each transmitter 605 can be configured to generate a first component signal of the differential transmit signal at a first polarity. The second transmission circuit 615 of each transmitter 605 can be configured to generate a second component signal of the differential transmit signal at the second polarity. The first component signals from each of the first transmission circuits 610 can be combined to form a first accumulated component signal. The second component signals from each of the second transmission circuits 615 can be combined to form a second accumulated component signal. Summing circuits can be used to combine the first and second component signals to form the first and second accumulated component signals, respectively. The first and second accumulated component signals can be biased and offset in a manner according to exemplary embodiments. The summing circuit 225 can then combine the offset and biased first and second accumulated component signals to form the differential transmit signal. Alternatively, the summing circuit 225 can perform the combination of the respective outputs of each of the first and second transmission circuits 610 and 615 within each of the transmitters 605, so that the aforementioned summing circuits can be eliminated.

First and second current drivers 205 and 210, bias signal circuit 215, offset signal circuit 220, summing circuit 225, bias signal control circuit 230, and offset signal control circuit 235 can each be implemented using any suitable electrical or electronic device capable of performing the functions associated with the respective element. For example, first and second current drivers 205 and 210 can each comprise a current source or any other suitable electrical device capable of generating a component signal of a differential transmit signal at a given polarity. For example, the offset signal circuit 220 can be comprised of a voltage follower in combination with a bias resistor that develops a stable reference current through one leg of a current mirror. The stable reference current can be mirrored to an output current ($I_{OFFSET}$) having a particular value defined by the stable reference current and the transistor geometries of the devices defining the current mirror. Other implementations and configurations of the respective elements can be used.

Additionally, first and second current drivers 205 and 210, bias signal circuit 215, offset signal circuit 220, summing circuit 225, bias signal control circuit 230, and offset signal control circuit 235 can be formed on a monolithic substrate. In other words, the elements of the line driver can be constructed of common integrated circuit elements and can be implemented on a single chip along with the remaining components of, for example, a high speed bidirectional communication transceiver or the like. In accordance with an exemplary embodiment of the present invention, the transformer or hybrid portion of the line interface circuit 203 is contemplated as an off-chip circuit element. Even though the exemplary embodiment contemplates the transformer being provided off-chip, it will be understood by skilled artisans familiar with integrated circuit design and fabrication that suitable transformers can be constructed from integrated circuit elements, such as combinations of spiral inductors and the like, and still provide sufficient DC coupling between the communication channel 204 and an integrated circuit transceiver.

While the line driver has been described in terms of integrated circuit technology implementing, for example, a gigabit-type multi-pair Ethernet transceiver or the like, it will be evident to one having ordinary skill in the art that the invention can be suitably implemented in other semiconductor technologies, such as bipolar, bi-CMOS, and the like, as well as be portable to other forms of bidirectional communication devices that operate in, for example, full duplex mode. According to an alternative exemplary embodiment, each component or device of line driver can be formed on, for example, a separate substrate and can be in communication with another component or device using any appropriate type of electrical connection that is capable of carrying electrical information. In other words, the circuitry according to the present invention can be constructed from discrete components as opposed to a monolithic circuit.

The line driver according to exemplary embodiments can be compatible with any suitable wired or wireless transmission protocol or network standard, such as, for example, 10BASE-T, 100BASE-T, 100BASE-TX, 1000BASE-T, 10 GBASE-T or the like. For example, the line driver can be configurable to accommodate both 1.0 V output swings characteristic of 1000BASE-T operation and 2.5 V output swings characteristic of 10BASE-T operation. For example, in 1000BASE-T (gigabit Ethernet), the differential transmit signal can comprise a gigabit Ethernet signal. The line interface circuit 203 can be any suitable type of interface circuit capable of interfacing the line driver with the communication channel 204, such as the interface circuit 110 illustrated in FIG. 1A or the like. The communication channel 204 can be any suitable type of communication channel capable of transmitting electrical information, such as a UTP or any other suitable wired or wireless communication channel.

Figure 7:
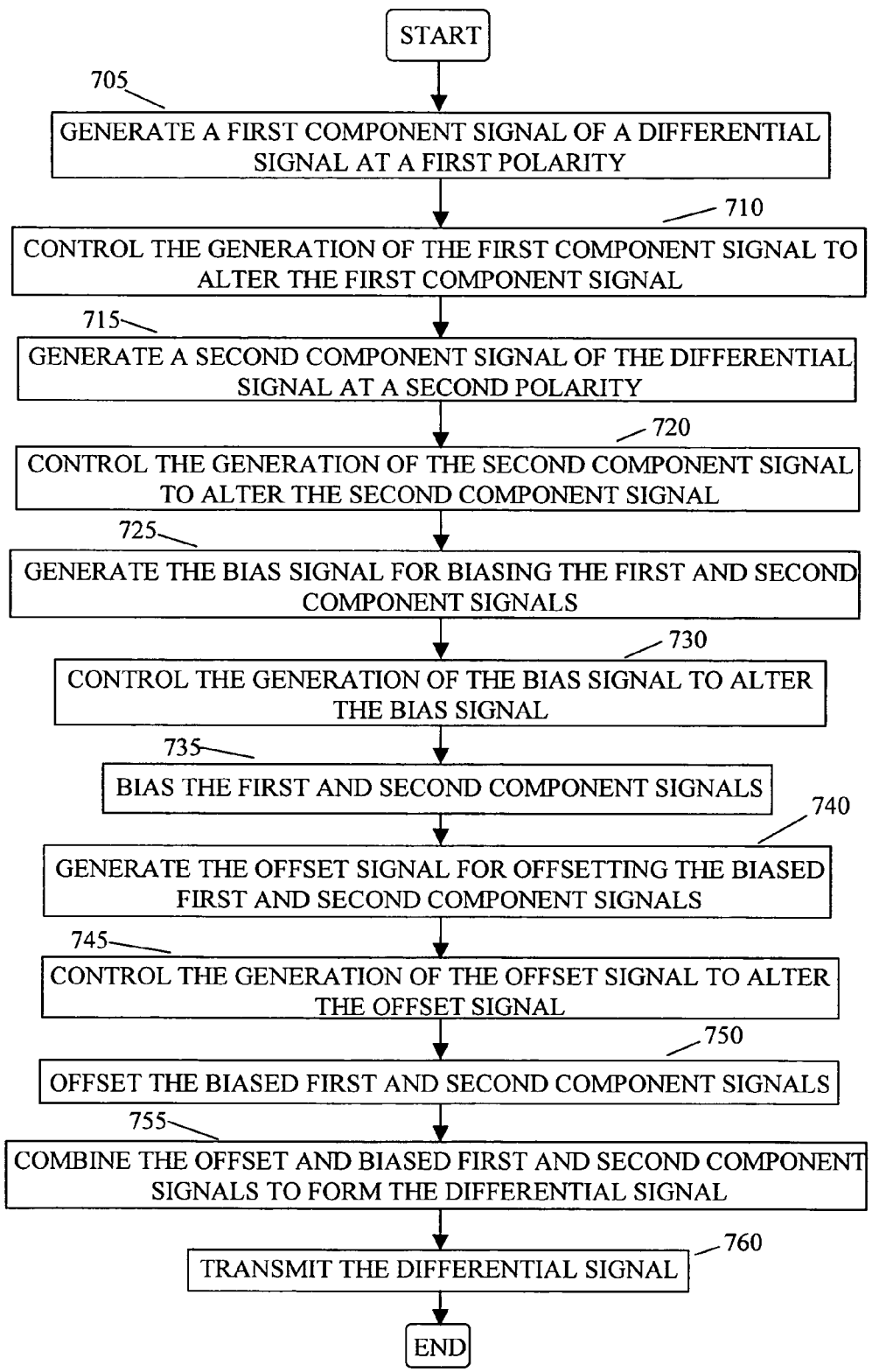
FIG. 7 is a flowchart illustrating steps for transmitting information, in accordance with an exemplary embodiment of the present invention.

FIG. 7 is a flowchart illustrating steps for communicating information, in accordance with an exemplary embodiment of the present invention. In step 705, a first component signal of a differential signal is generated at a first polarity. Optionally, in step 710, the generation of the first component signal can be controlled to alter the first component signal. In step 715, a second component signal of the differential signal is generated at a second polarity. Optionally, in step 720, the generation of the second component signal can be controlled to alter the second component signal. In step 725, a bias signal is generated for biasing the first and second component signals. Optionally, in step 730, the generation of the bias signal can be controlled to alter the bias signal. In step 735, the first and second component signals are biased using the bias signal. In step 740, the offset signal is generated for offsetting the biased first and second components signals. Optionally, in step 745, the generation of the offset signal can be controlled to alter the offset signal. In step 750, the biased first and second component signals are offset using the offset signal. In step 755, the offset and biased first and second component signals are combined to form the differential signal. In step 760, the differential signal is transmitted via a communication channel.

Figure 8:
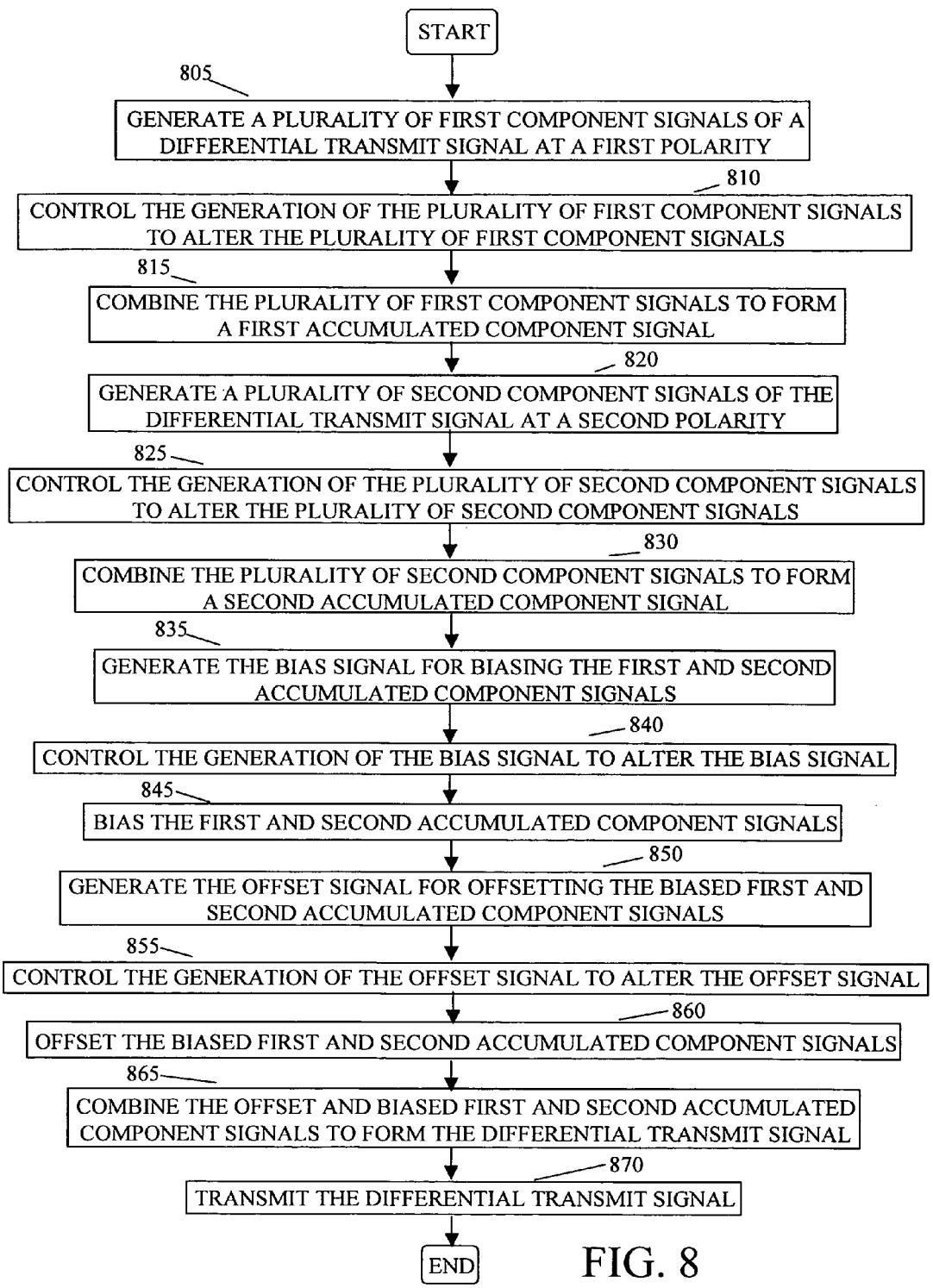
FIG. 8 is a flowchart illustrating steps for transmitting information, in accordance with an alternative exemplary embodiment of the present invention.

FIG. 8 is a flowchart illustrating steps for communicating information, in accordance with an alternative exemplary embodiment of the present invention. In step 805, a plurality of first component signals of a differential transmit signal are generated at a first polarity. Optionally, in step 810, the generation of the plurality of first component signals can be controlled to alter the plurality of first component signals. In step 815, the plurality of first component signals are combined to form a first accumulated component signal. In step 820, a plurality of second component signals of the differential transmit signal are generated at a second polarity. Optionally, in step 825, the generation of the plurality of second component signals can be controlled to alter the plurality of second component signals. In step 830, the plurality of second component signals are combined to form a second accumulated component signal. In step 835, the bias signal is generated for biasing the first and second accumulated component signals. Optionally, in step 840, the generation of the bias signal can be controlled to alter the bias signal. In step 845, the first and second accumulated component signals are biased using the bias signal. In step 850, the offset signal is generated for offsetting the biased first and second accumulated component signals. Optionally, in step 855, the generation of the offset signal can be controlled to alter the offset signal. In step 860, the biased first and second accumulated component signals are offset using the offset signal. In step 865, the offset and biased first and second accumulated component signals are combined to form the differential transmit signal. In step 870, the differential transmit signal is transmitted via a communication channel.

According to exemplary embodiments, the method of communicating information illustrated in FIGS. 7 and 8 can be compatible with any suitable wired or wireless transmission protocol or network standard, including, for example, 10BASE-T, 100BASE-T, 100BASE-TX, 1000BASE-T, 10 GBASE-T or the like.

Exemplary embodiments of the present invention can be used in any suitable application or system capable of communicating information, such as any appropriate form of transmitter or transceiver. For example, the line driver 201 illustrated in FIG. 2 can be used in any suitable application where a DAC is utilized as a line driver. For example, exemplary embodiments of the present invention can be used with the class B driver disclosed in U.S. Pat. No. 6,844,837, the entire contents of which are hereby incorporated by reference herein. The line driver 201 can also form part of an Ethernet controller or transceiver or the like.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A line driver comprising:
   a first driver circuit,
      wherein the first driver circuit is configured to generate a first component signal of a differential signal at a first polarity;
   a second driver circuit,
      wherein the second driver circuit is configured to generate a second component signal of the differential signal at a second polarity, and
      wherein the first and second component signals are biased via a bias signal to form biased first and second component signals; and
   an offset signal circuit in communication with the first and second driver circuits,
      wherein the offset signal circuit is configured to generate an offset signal for offsetting the biased first and second component signals, and
      wherein a combination of the offset and biased first and second component signals forms the differential signal,
   wherein a first average current of a sum of the biased first and second component signals for a set of transmit symbols is less than a second average current of the differential signal for the set of transmit symbols.

2. The line driver of claim 1, further comprising a summing circuit in communication with the first and second driver circuits,
   wherein the summing circuit is configured to combine the offset and biased first and second component signals to form the differential signal.

3. The line driver of claim 1, further comprising a bias signal circuit in communication with the first and second driver circuits, wherein the bias signal circuit is configured to generate the bias signal for biasing the first and second component signals.

4. The line driver of claim 3, further comprising a bias signal control circuit in communication with the bias signal circuit,
wherein the bias signal control circuit is configured to control the bias signal circuit to alter the bias signal.

5. The line driver of claim 1, further comprising an offset signal control circuit in communication with the offset signal circuit,
wherein the offset signal control circuit is configured to control the offset signal circuit to alter the offset signal.

6. The line driver of claim 1, further comprising a driver control circuit in communication with the first and second driver circuits,
wherein the driver control circuit is configured to control generation of the first and second component signals by the first and second driver circuits, respectively.

7. The line driver of claim 1, further comprising:
a line interface circuit in communication with the first and second driver circuits,
wherein the line interface circuit is configured to interface the line driver to a communication channel.

8. The line driver of claim 1, wherein each of the first and second driver circuits comprises a current source.

9. The line driver of claim 1, wherein the differential signal comprises a gigabit Ethernet signal.

10. The line driver of claim 1, wherein the line driver is compatible with a standard selected from the group consisting of 10BASE-T, 100BASE-T, 100BASE-TX, 1000BASE-T and 10 GBASE-T.

11. The line driver of claim 1, wherein the line driver is formed on a monolithic substrate.

12. The line driver of claim 1, wherein the line driver comprises a class A-B differential line driver.

13. An Ethernet controller comprising the line driver of claim 1.

14. A digital-to-analog converter comprising the line driver of claim 1.

15. A signal transmission system comprising:
a first set of transmitters configured to generate a first component signal of a differential transmit signal at a first polarity;
a second set of transmitters configured to generate a second component signal of the differential transmit signal at a second polarity,
wherein the first and second component signals are biased via a bias signal to form biased first and second component signals; and
an offset signal circuit in communication with the first and second sets of transmitters,
wherein the offset signal circuit is configured to generate an offset signal for offsetting the biased first and second component signals, and
wherein a combination of the offset and biased first and second component signals forms the differential transmit signal,
wherein a first average current of a sum of the biased first and second component signals for a set of transmit symbols is less than a second average current of the differential transmit signal for the set of transmit symbols.

16. The signal transmission system of claim 15, wherein each of the first and second sets of transmitters comprises a summing circuit for combining outputs of the transmitters within the set.

17. The signal transmission system of claim 15, further comprising a summer in communication with the first and second sets of transmitters,
wherein the summer is configured to combine the offset and biased first and second component signals to form the differential transmit signal.

18. The signal transmission system of claim 15, further comprising a bias signal circuit in communication with the first and second sets of transmitters,
wherein the bias signal circuit is configured to generate the bias signal for biasing the first and second component signals.

19. A signal transmission system comprising:
a plurality of transmitters arranged in parallel,
wherein each transmitter comprises:
a first transmission circuit,
wherein the first transmission circuit is configured to generate a first component signal of a differential transmit signal at a first polarity; and
a second transmission circuit,
wherein the second transmission circuit is configured to generate a second component signal of the differential transmit signal at a second polarity,
wherein the first component signals from each of the first transmission circuits are combined to form a first accumulated component signal,
wherein the second component signals from each of the second transmission circuits are combined to form a second accumulated component signal, and
wherein the first and second accumulated component signals are biased via a bias signal to form biased first and second accumulated component signals; and
an offset circuit in communication with the plurality of transmitters,
wherein the offset circuit is configured to generate an offset signal for offsetting the biased first and second accumulated component signals, and
wherein a sum of the offset and biased first and second accumulated component signals forms the differential transmit signal,
wherein a first average current of a sum of the biased first and second accumulated component signals for a set of transmit symbols is less than a second average current of the differential transmit signal for the set of transmit symbols.

20. The signal transmission system of claim 19, further comprising an accumulator in communication with each of the first transmission circuits,
wherein the accumulator is configured to accumulate the first component signals to form the first accumulated component signal.

21. The signal transmission system of claim 19, further comprising an accumulator in communication with each of the second transmission circuits,
wherein the accumulator is configured to accumulate the second component signals to form the second accumulated component signal.

22. The signal transmission system of claim 19, further comprising a summing circuit in communication with the plurality of transmitters,
wherein the summing circuit is configured to sum the offset and biased first and second accumulated component signals to form the differential transmit signal.

23. The signal transmission system of claim 19, further comprising a bias circuit in communication with the plurality of transmitters, wherein the bias circuit is configured to generate the bias signal for biasing the first and second accumulated component signals.

24. A method of transmitting information comprising:
generating a first component signal of a differential signal at a first polarity;
generating a second component signal of the differential signal at a second polarity;
biasing the first and second component signals via a bias signal;
offsetting the biased first and second component signals; and
combining the offset and biased first and second component signals to form the differential signal,
wherein a first average current of a sum of the biased first and second component signals for a set of transmit symbols is less than a second average current of the differential signal for the set of transmit symbols.

25. The method of claim 24, further comprising generating the bias signal.

26. The method of claim 25, further comprising altering the bias signal.

27. The method of claim 24, further comprising generating the offset signal.

28. The method of claim 27, further comprising altering the offset signal.

29. The method of claim 24, further comprising:
altering the first component signal; and
altering the second component signal.

30. The method of claim 24, further comprising transmitting the differential signal via a communication channel.

31. The method of claim 24, wherein the differential signal comprises a gigabit Ethernet signal.

32. The method of claim 24, wherein the method is compatible with a standard selected from the group consisting of: 10BASE-T, 100BASE-T, 100BASE-TX, 1000BASE-T and 10 GBASE-T.

33. A method of communicating information comprising:
generating a plurality of first component signals of a differential transmit signal at a first polarity;
combining the plurality of first component signals to form a first accumulated component signal;
generating a plurality of second component signals of the differential transmit signal at a second polarity;
combining the plurality of second component signals to form a second accumulated component signal;
biasing the first and second accumulated component signals via a bias signal;
offsetting the biased first and second accumulated component signals; and
combining the offset and biased first and second accumulated component signals to form the differential transmit signal,
wherein a first average current of a sum of the biased first and second accumulated component signals for a set of transmit symbols is less than a second average current of the differential transmit signal for the set of transmit symbols.

34. The method of claim 33, further comprising generating the bias signal.

35. The method of claim 33, further comprising generating the offset signal.

36. The line driver of claim 1, wherein the first average current and the second average current are each associated with 0, 1, and −1 symbols.

37. The line driver of claim 1, wherein a maximum amplitude of the first and second biased component signals is reduced to generate the first and second offset and biased component signals after the offsetting of the biased first and second component signals, and
wherein the reduction in the maximum amplitude is the same as a current level of the offset signal.

38. The line driver of claim 1, wherein the minimum current level of the first and second offset and biased component signals is equal to a bias current level used to form the biased first and second component signals.

39. The line driver of claim 1, wherein a differential amplitude of the sum of the biased first and second component signals is the same as a differential amplitude of the differential signal for a transmit symbol.

40. The line driver of claim 1, wherein the first average current and the second average current are determined based on respective weighted current levels of the biased first and second component signals and the differential signal over the set of transmit symbols.

41. The line driver of claim 1, wherein a current level of a higher one of the first and second biased component signals is reduced by a predetermined amount during transmission of a symbol and relative to a bias and offset current level to generate a higher one of the first and second offset and biased component signals,
wherein the bias and offset current level corresponds to a sum of a bias current and an offset current of the first and second offset and biased component signals.

42. The line driver of claim 1, wherein a maximum current amplitude of the first and second offset and biased component signals relative to a bias and offset current level is less than a maximum current amplitude of the first and second biased component signals relative to a bias current level.

43. The line driver of claim 1, wherein a current level of a higher one of the first and second biased component signals is greater than a current level of a higher one of the first and second offset and biased component signals for a transmitted symbol relative to a bias and offset current level,
wherein the bias and offset current level corresponds to a sum of a bias current and an offset current of the first and second offset and biased component signals.

44. The line driver of claim 1, wherein a maximum magnitude of the first and second biased component signals that is less than a bias and offset current level for a transmitted symbol is increased to generate the second offset and biased component signals after the offsetting of the first and second biased component signals,
wherein the bias and offset current level corresponds to a sum of a bias current and an offset current of the first and second offset and biased component signals, and
wherein the increase in the maximum magnitude is equal to a current level of the offset signal.

45. The line driver of claim 1, wherein difference between the first average current and the second average current is less than a current level of the offset signal.

46. The line driver of claim 1, wherein the bias signal and the offset signal are current bias signals.

47. The line driver of claim 41, wherein a current level of the higher one of the first and second biased component signals is not reduced by the predetermined amount during transmission of another symbol and relative to a bias and offset current level to generate the higher one of the first and second offset and biased component signals.

* * * * *